Sept. 18, 1945.　　　A. R. HOUK　　　2,384,918

DOWEL CONSTRUCTION

Filed June 10, 1944

INVENTOR.
ADDISON RAY HOUK
BY
Harness and Harris
ATTORNEYS.

Patented Sept. 18, 1945

2,384,918

UNITED STATES PATENT OFFICE 2,384,918

DOWEL CONSTRUCTION

Addison Ray Houk, Detroit, Mich., assignor to Chrysler Corporation, Highland Park, Mich., a corporation of Delaware Application June 10, 1944, Serial No. 539,678

4 Claims. (85—14)

This application relates to means for holding parts together. More specifically it relates to a dowel construction for holding parts in predetermined relation either permanent or temporarily.

It is known to hold parts together with dowel pins. Frequently it is customary to hold the parts together temporarily for operations such as machining; then to disassemble, and finally to reassemble them permanently. If dowels heretofore known are employed, two sets must be used, one for temporary assembly, the other for final assembly, and the holes receiving the dowels must be reamed between permanent and temporary assembly, for the parts cannot be disassembled without injury to the holes by the dowels. Moreover, it is difficult to ream holes accurately to size in parts formed of aluminum such as may be used in aircraft construction. Many dowels require accurately finished holes.

I propose a dowel construction that makes possible disassembly of parts without injury to the openings receiving the dowels, and that is adapted for holes of various sizes, thereby doing away with the necessity for accurately finished holes.

An object of my invention is to provide an improved dowel construction for holding parts together. The parts may be held together either permanently or temporarily, and disassembly of the parts may be easily effected.

A further object is the provision of a dowel construction that coacts with the openings of parts to be held together in such a way that there is no injury to the openings before the parts could again be held by dowels. Incidentally, there is no requirement for a new set of dowels for the refinished openings.

Another object is to provide a dowel construction that will fit openings of various sizes. This does away with the requirement for an accurate finishing of the holes, which is almost an impossibility in certain metals customarily used in aircraft.

Other objects will appear from the disclosure.

Figure 1:
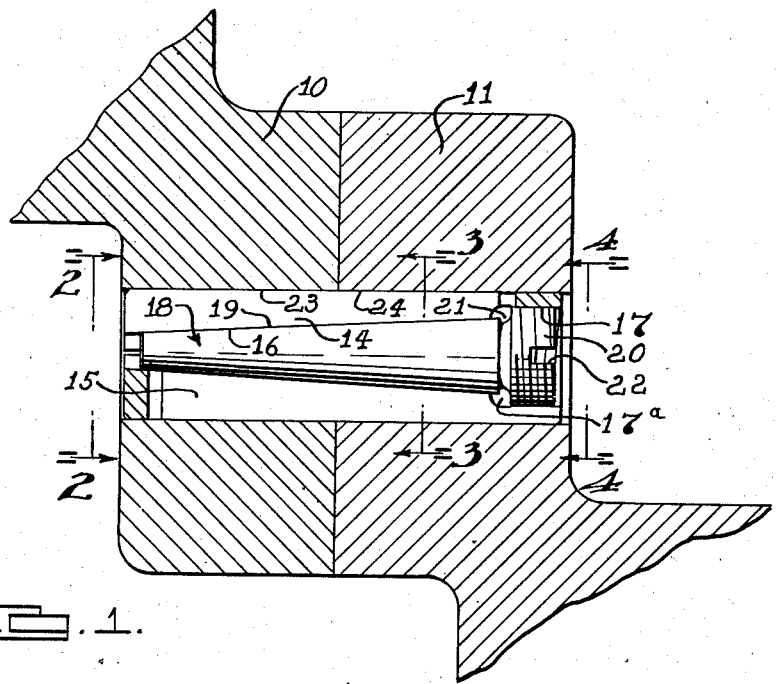
Fig. 1 is a sectional view showing the use of the novel dowel construction of the present invention.
Figures 2, 3, 4:
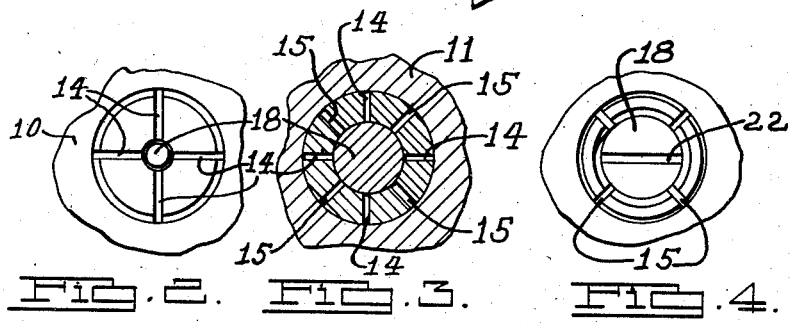
Fig. 2 is a view taken along the line 2—2 of Fig. 1.
Fig. 3 is a sectional view taken along the line 3—3 of Fig. 1.
Fig. 4 is a view taken along the line 4—4 of Fig. 1.
Figure 5:
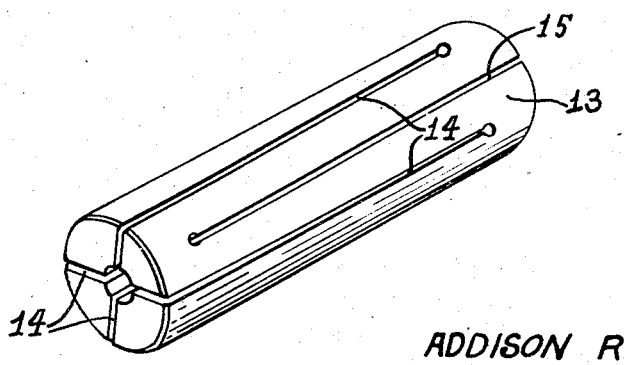
Fig. 5 is a perspective view of an expandible sleeve forming part of the novel dowel construction.

The reference characters 10 and 11 designate machined parts adapted to be held together by a novel dowel construction 12. These parts may form part of an aircraft engine structure. The novel dowel construction includes a sleeve 13 shown in Fig. 5. This sleeve is expandible because it has four slots 14 extending from one end to a region adjacent the other end, and four slots 15 extending from the other end to a region adjacent the said one end. The slots 14 are alternately placed with respect to the slots 15. The expandible sleeve 13 has a conical interior surface 16 extending for a greater portion of its length and at the end adjacent the larger end of the conical surface 16 a threaded portion 17. A groove 17a joins the conical surface 16 and threaded portion 17. Positioned within the sleeve 13 is a member 18 having an exterior conical surface 19 extending for a greater portion of its length in contact with the interior conical surface 16 of the sleeve 13. The member 18 has at its end adjacent the larger end of the conical surface 19 an exterior threaded portion 20 engaging the interior threaded portion 17 of the expandible sleeve 13. A groove 21 is formed on the member 18 between the conical surface 19 and the threaded portion 20. A recess or slot 22 is formed in the end of the member 18 for receiving a tool such as a screw driver for turning the member 18 with respect to the sleeve 13. As is evident, turning of the member 18 causes an axial movement of the member with respect to the sleeve 13, bringing about engagement of the conical surfaces 16 and 19. As turning of the member 18 continues, the expandible sleeve 13 is expanded into tight holding engagement with openings 23 and 24 formed in the parts 10 and 11 respectively. This engagement is sufficient to hold these parts firmly in place with respect to one another. As is to be seen from Fig. 3, the sleeve 13 is formed of eight separate sections by the grooves 14 and 15 extending through the greater portion of the length of the sleeve, and this formation makes the sleeve readily expandible. It will be observed that both the sleeve 13 and the member 19 are contained entirely within the combined lengths of the openings 23 and 24 in which the sleeve and member are positioned.

The dowel construction just described may be used either for temporary assembly of parts or for permanent assembly thereof. For example, the parts may be temporarily joined in order to receive a final machining operation and there-after they may be disassembled prior to a final assembly. With the use of the novel dowel construction of the present invention this assembly may be made easily and without damage to the holes formed in the parts. For disassembly the member 18 need only be unscrewed sufficiently with respect to the sleeve 13 as to release the sleeve from holding engagement with the openings 23 and 24 and the sleeve and member may then be withdrawn. This operation of withdrawal causes no injury to the openings and they need not be again machined for receiving a dowel for final assembly.

It is also to be stated that the openings 23 and 24 need not be machined accurately to size for there is sufficient flexibility in the expandible sleeve 13 for the sleeve to grip openings of different sizes. This is of great advantage in aircraft work, which requires the use of metals that are sometimes very difficult to machine or ream to size.

It will be understood that a plurality of dowels may be used to join parts and in this case the dowel has special advantage. With ordinary dowels disassembly had to be accomplished by a prying of the parts loose from one another, and since the parts could hardly be pryed apart equally and simultaneously at all the dowels a tilting of the parts with respect to one another was required, and this generally damaged the holes receiving the dowels. In the present invention the dowels are removed simply and easily after the members 18 are unscrewed with respect to the sleeve 13, and no prying is required.

The intention is to limit the invention only within the scope of the appended claims.

I claim:

1. The combination with a plurality of parts adapted to be held together and having aligned holes, of a dowel comprising an expandible holding sleeve fitting within the openings and internal conical surface portions located in the aligned holes of at least two of the plurality of parts and a member having exterior conical surface portions located in the aligned holes of at least two of the plurality of parts in engagement with internal conical surface portions on the sleeve and being axially adjustable with respect to the sleeve for acting through the conical surface portions to expand the sleeve into holding engagement with the aligned openings of at least two of the plurality of parts, the sleeve and the member being associated with threaded portions engaging one another for causing axial adjustment of the member with respect to the sleeve to result from relative turning of the threaded portions, the member being at least as short as the sleeve so as to be enabled to be contained entirely within the length of the sleeve.

2. The combination with a plurality of parts adapted to be held together and having aligned holes, of a dowel comprising an expandible sleeve positioned in the holes in the parts entirely within the combined length of the holes and having a conical interior surface extending through the greater portion of the length of the sleeve and through the openings in the plurality of the parts and an interior thread at one end and a member positioned in the expandible sleeve and having a conical exterior extending for the greater portion of its length and through the openings and an exterior thread at one end engaging the interior thread in the sleeve for causing rotation of the member to move the member axially with respect to the sleeve for expanding the sleeve into tight holding engagement with the holes in the parts, the threads on the sleeve and the member being adjacent the large ends of the conical surfaces on the sleeve and the member, the member being shorter than the sleeve so as to be adapted to be contained entirely within the length of the sleeve.

3. A dowel adapted to be contained within the combined lengths of aligned openings in parts to be held together by the dowel and comprising an expandible sleeve provided with longitudinal slots extending from one end and the other end into adjacency with the other end and the one end, respectively, and having a conical interior surface extending for the greater portion of the length of the sleeve and an interior threaded portion at the end of the sleeve adjacent the larger end of the conical surface and a member positioned within the sleeve and having an exterior conical surface extending for the greater portion of its length and an exterior threaded portion located at the end adjacent the larger end of the conical surface of the pin and engaging the threaded portion in the sleeve for causing rotation of the member with respect to the sleeve to move the member axially of the sleeve for engaging the conical surfaces of the member and the sleeve and expanding the sleeve into tight holding engagement with the aligned openings in the parts, the member being at least as short as the sleeve so as to be enabled to be contained entirely within the length of the sleeve.

4. A dowel adapted to hold together certain parts by cooperation with aligned openings in the parts and comprising an expandible sleeve having an inner threaded portion and a member having an external thread engaging the internal thread of the sleeve and being axially adjustable with respect to the sleeve through turning of the member for expanding the sleeve into tight holding engagement with the aligned openings of the parts and being shorter than the sleeve so as to be adapted to be contained entirely within the length of the sleeve.

ADDISON RAY HOUK.